United States Patent
Hansen et al.

(10) Patent No.: US 10,479,034 B2
(45) Date of Patent: Nov. 19, 2019

(54) METHOD AND MOULDING SYSTEM FOR MANUFACTURING A FIBRE-REINFORCED POLYMER OBJECT VIA A FEEDBACK SYSTEM FOR CONTROLLING RESIN FLOW RATE

(71) Applicant: LM WP PATENT HOLDING A/S, Kolding (DK)

(72) Inventors: Poul Erik Hansen, Kolding (DK); Harsha Tummala, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 849 days.

(21) Appl. No.: 14/411,728

(22) PCT Filed: Jul. 4, 2013

(86) PCT No.: PCT/EP2013/064122
§ 371 (c)(1),
(2) Date: Dec. 29, 2014

(87) PCT Pub. No.: WO2014/006131
PCT Pub. Date: Jan. 9, 2014

(65) Prior Publication Data
US 2015/0174835 A1    Jun. 25, 2015

(30) Foreign Application Priority Data

Jul. 5, 2012 (EP) ..................... 12175080

(51) Int. Cl.
*B29C 70/44* (2006.01)
*B29C 70/54* (2006.01)
(Continued)

(52) U.S. Cl.
CPC .......... *B29C 70/548* (2013.01); *B29C 70/443* (2013.01); *B29C 70/48* (2013.01);
(Continued)

(58) Field of Classification Search
CPC .................................................... B29C 70/548
(Continued)

(56) References Cited

U.S. PATENT DOCUMENTS 5,516,271 A * 5/1996 Swenor ................... B29C 70/48
264/257
5,518,388 A * 5/1996 Swenor ................... B29C 70/48
425/144
(Continued)

FOREIGN PATENT DOCUMENTS

EP   1019631 A1   7/2000
EP   2404743 A1   1/2012
(Continued)

*Primary Examiner* — Atul P. Khare
(74) *Attorney, Agent, or Firm* — Nath, Goldberg & Meyer; Jerald L. Meyer; Tanya E. Harkins

(57) ABSTRACT

A method of manufacturing a fibre-reinforced polymer object by means of vacuum-assisted resin transfer moulding (VARTM), wherein fibre material is impregnated with liquid resin in a mould cavity comprising a rigid mould part having a mould surface defining an outer surface of the object, is described. One or more pressure sensors are connected to resin inlets of the VARTM system. A control unit is used for controlling a polymer supply unit based on measured resin pressure and is adapted to adjusting a resin flow rate, if pressure measured by the pressure sensors is below a lower threshold level or above a higher threshold level.

8 Claims, 7 Drawing Sheets

(51) Int. Cl.
*B29C 70/48* (2006.01)
*F03D 1/00* (2006.01)
*B29L 31/08* (2006.01)
*B29K 105/10* (2006.01)

(52) U.S. Cl.
CPC .......... *B29C 70/54* (2013.01); *B29K 2105/10* (2013.01); *B29L 2031/085* (2013.01); *Y02E 10/721* (2013.01)

(58) Field of Classification Search
USPC ....................................................... 264/40.3
See application file for complete search history.

(56) References Cited

U.S. PATENT DOCUMENTS

| | | | | |
|---|---|---|---|---|
| 5,665,301 A * | 9/1997 | Alanko | ................ | B29C 70/443 264/257 |
| 5,971,742 A * | 10/1999 | McCollum | .............. | B29C 33/04 264/316 |
| 6,143,215 A * | 11/2000 | McCollum | ............ | B29C 33/405 264/316 |
| 6,168,408 B1 * | 1/2001 | Boime | .................... | B29C 70/48 264/40.3 |
| 6,623,672 B2 * | 9/2003 | McCollum | ............ | B29C 70/443 264/257 |
| 6,818,159 B2 * | 11/2004 | Hinz | .................... | B29C 70/443 264/102 |
| 7,686,608 B2 * | 3/2010 | Slaughter | .............. | B29C 70/443 264/257 |
| 7,758,800 B2 * | 7/2010 | Cicci | .................... | B29C 70/546 264/257 |
| 7,797,075 B1 * | 9/2010 | Zhang | .................. | B29C 70/443 264/40.1 |
| 7,803,302 B2 * | 9/2010 | Hansen | ................ | B29C 70/546 264/258 |
| 7,939,001 B2 * | 5/2011 | Liebmann | ............. | B29C 70/546 264/257 |
| 7,943,078 B2 * | 5/2011 | Sekido | ................ | B29C 33/0066 264/257 |
| 8,216,500 B2 * | 7/2012 | Olesen | .................. | B29C 70/443 156/145 |
| 8,221,666 B2 * | 7/2012 | Mikkelsen | ............ | B29C 70/443 264/101 |
| 8,440,120 B2 * | 5/2013 | Mikkelsen | ............ | B29C 70/443 264/102 |
| 8,449,804 B2 * | 5/2013 | Schibsbye | ............. | B29C 70/543 264/257 |
| 8,708,014 B2 * | 4/2014 | Schibsbye | ............. | B29C 70/443 156/378 |
| 8,851,878 B2 * | 10/2014 | Schultz | .................. | B01D 53/04 425/388 |
| 8,945,450 B2 * | 2/2015 | Shindo | .................. | B29C 70/548 264/257 |
| 8,992,819 B2 * | 3/2015 | Frankowski | ............ | B29C 70/44 264/511 |
| 9,073,273 B2 * | 7/2015 | Guru Prasad | ......... | B29C 70/443 |
| 2004/0130072 A1 * | 7/2004 | Sekido | .................. | B29C 70/443 264/408 |
| 2005/0079241 A1 * | 4/2005 | Moore | .................. | B29C 70/086 425/388 |
| 2007/0057413 A1 * | 3/2007 | Haney | ................... | B29C 70/443 264/510 |
| 2011/0104323 A1 * | 5/2011 | Schultz | .................. | B01D 53/04 425/388 |
| 2011/0146896 A1 * | 6/2011 | Schibsbye | ........... | B29C 33/0061 156/245 |
| 2012/0007269 A1 * | 1/2012 | Olesen | .................. | B29C 70/443 264/101 |
| 2014/0333008 A1 * | 11/2014 | Harboe | ................. | B29C 70/443 264/299 |

FOREIGN PATENT DOCUMENTS

GB 2403927 A 1/2005
WO WO-2013072074 A1 * 5/2013 ........... B29C 70/443

* cited by examiner

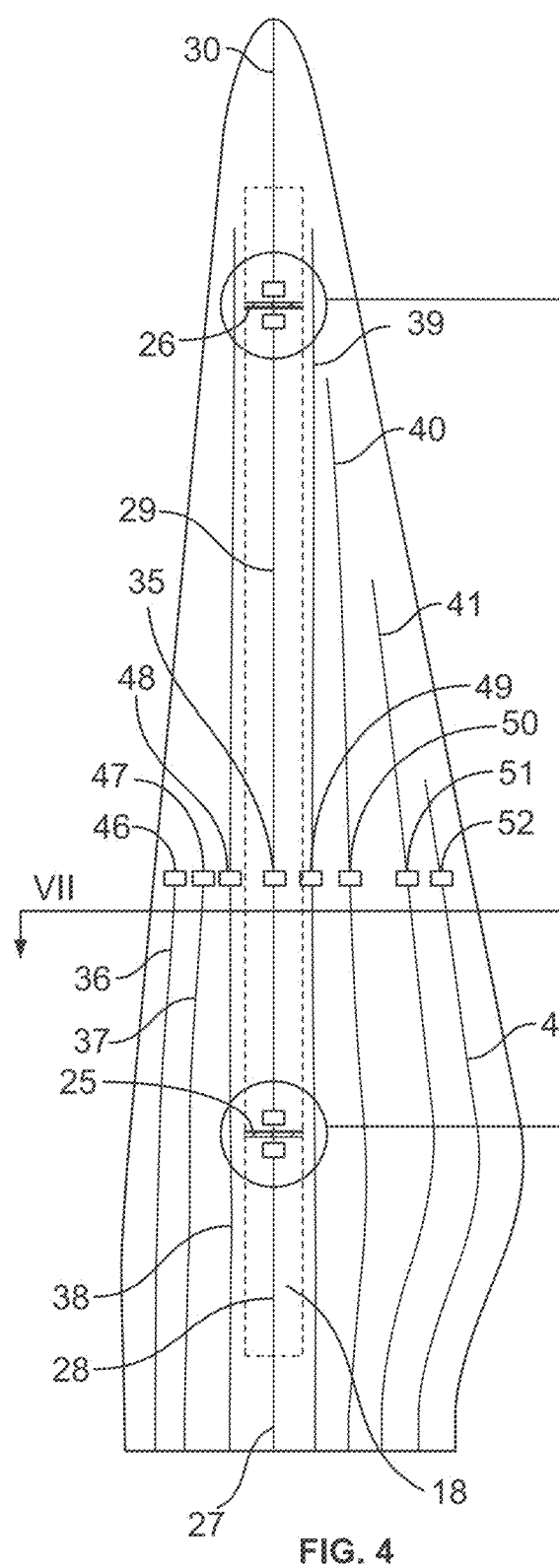
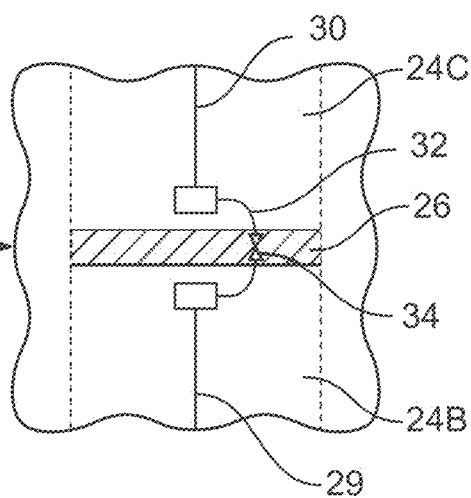
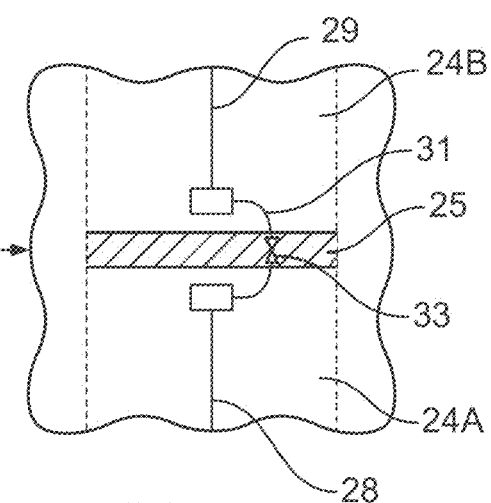

METHOD AND MOULDING SYSTEM FOR MANUFACTURING A FIBRE-REINFORCED POLYMER OBJECT VIA A FEEDBACK SYSTEM FOR CONTROLLING RESIN FLOW RATE

This is a National Phase Application filed under 35 U.S.C. 371 as a national stage of PCT/EP2013/064122, filed Jul. 4, 2013, and claims priority benefit from European Application Number 12175080.6, filed Jul. 5, 2012, the content of which is hereby incorporated by reference in its entirety.

TECHNICAL FIELD

The present invention relates to a method of manufacturing a fibre-reinforced polymer object by means of vacuum-assisted resin transfer moulding (VARTM), wherein fibre material is impregnated with liquid resin in a mould cavity comprising a rigid mould part having a mould surface defining an outer surface of the object. The invention further relates to a moulding system comprising: a rigid mould part having a mould surface defining an outer surface of a fibre-reinforced polymer object moulded in said system, a vacuum bag for sealing against the rigid mould part so as to form a mould cavity, a vacuum source connected to the mould cavity so as to evacuate the mould cavity, one of more resin inlets connected to the mould cavity, and a polymer supply unit connected to the resin inlets and adapted to supply resin to the resin inlets.

BACKGROUND ART

The invention in particular relates to a method and moulding system for manufacturing blade shell parts of a wind turbine blade, advantageously blades having a pre-bent curvature. Such blades are typically assembled from blade shell halves. One of the shell halves forms the pressure side of the blade and other shell half forms the suction side. The pressure side of the blade is also called the upwind side, as it faces the wind during operation of the wind turbine. The suction side of the blade is also called the downwind side, as it faces away from the wind during operation of the wind turbine.

By pre-bent blade is to be understood a blade which as seen from the root region towards the tip region at a distance from the root region extends forwards towards the wind in a forwardly curving manner so that the tip of the blade is positioned in front of the centre line of the root region. An example of a pre-bent wind turbine blade is disclosed in EP 1019631B1.

Wind turbine blades made of a composite material, such as fibre-reinforced resin, are flexible and when subjected to a gust they may flex up to about 6-8 m or more at the tip depending on the length thereof.

Pre-bent blades may have such a curvature that the tip is arranged 0.5-4 m or more from the centre line of root depending on the length of the blade.

As wind turbine blades have become progressively longer in the course of time and today can be more than 70 m long, it has become increasingly attractive to use pre-bent blades for wind turbines, as they allow for placing the wind turbine rotor close to the tower of the wind turbine, while still avoiding that the blade collides with the tower when subjected to a gust.

When manufacturing blade shell halves the mould is generally arranged so that the line corresponding to the centre line of the root region of the blade is substantially horizontal. This centre line often corresponds to a pitch axis of the blade.

However, when manufacturing the shell halves for pre-bent blades, especially blades pre-bent to arrange the tip about 1 m or more in front of the centre line of the root region, the fibre/resin ratio tends to be higher in the highest positioned areas of the mould surface than in the lowest positioned areas of the mould surface as seen in the longitudinal direction of the mould. This is especially the case in a longitudinally extending zone located at the lowest area of the mould as seen in the transverse direction thereof. In the above zone a plurality of fibre layers is frequently placed on top of each other in order to form a load-bearing structure of the blade shell half comprising a substantially higher number of fibre layers than laterally adjacent areas of the fibre lay-up.

Thus, due to the gravity acting on the resin, a too high fibre/resin ratio tends to be formed at the highest positioned areas of the mould and a too low fibre/resin ratio tends to be formed at the lowest positioned areas of the mould as seen in the longitudinal direction thereof.

A too high fibre/resin ratio has a negative influence on the fatigue strength of a composite material comprising fibre-reinforced resin. This is especially a problem when moulding the upwind shell half, as the highest positioned area of the mould surface is in the mid portion of the half shell when seen in the longitudinal direction and as the mid portion of the blade is subjected to high loads during operation of the wind turbine.

EP 2 404 743 by the present applicant discloses a method to ameliorate the above problem by dividing resin infusion into separate areas so as to mimisise the effect of gravity acting on the resin with the effect that the fibre/resin ratio can more accurately controlled of the finished wind turbine blade shell in the separate areas. However, even in this manufacturing setup, it has proven difficult to control the fibre/resin ratio of the separate areas of the wind turbine blade shell to a high degree.

GB 2 403 927 A discloses a method and apparatus for moulding composite articles. The method and apparatus comprises the use of a skin, which defines a mould cavity. A pressure sensor is connected to the skin so as to generate a signal indicative of pressure in the cavity. A control unit controls injection of resin into the cavity and may cut off the resin supply, if the sensed pressure becomes too high.

DISCLOSURE OF THE INVENTION

Therefore, it is an object of the invention to obtain a new manufacturing method and moulding system, which overcome or ameliorate at least one of the disadvantages of the prior art or which provide a useful alternative.

According to a first aspect, the object is obtained by a method of the aforementioned kind comprising the following steps:
a) arranging a fibre lay-up including a number of fibre layers on the mould surface,
b) arranging at least one resin inlet above the fibre lay-up,
c) attaching one or more pressure sensors to or near the at least one resin inlet,
d) arranging a vacuum bag on top of the rigid mould part and sealing the vacuum bag to the mould part to define the mould cavity,
e) evacuating the mould cavity,
f) supplying liquid resin to the mould cavity so as to impregnate the fibre lay-up, g) continuously monitoring a signal from the one or more pressure sensor, i.e. monitoring the pressure and generating a signal indicative of said measured pressure, h) feeding said signal back to a control unit that controls a resin flow rate supplied to the resin inlets, i) increasing a resin flow rate, if the pressure measured by the pressure sensors at the resin inlet drops below a lower threshold level, and decreasing the resin flow rate, if the pressure measured by the pressure sensors at the resin inlet is above a higher pressure threshold, and j) allowing resin to cure so as to form the fibre-reinforced polymer object.

Accordingly, it is seen that the pressure is continuously monitored at the resin inlets. Thus, if the pressure at the resin inlet drops below the lower pressure threshold, which would normally lead to a thin laminate, too high fibre/resin ratio and possibly dry glass or air pockets, the resin flow rate is increased. Conversely, the resin flow rate is decreased, if the pressure at the resin inlet is above the higher pressure threshold, which would normally lead to wrinkles or resin pools and a too low fibre/resin ratio due to release of the pretension of the fibre layers. Thus, it is possible to a high degree to control the fibre/resin ratio of the fibre-reinforced polymer object and reduce the risk of formation of wrinkles and air pockets in the object or prevent it entirely. Further, the continuous monitoring and control of the resin pressure makes it possible to accommodate for the fact that the pressure at the resin inlets may change over time as the resin is injected into and propagates through the mould cavity. By arranging the pressure sensors to or near the resin inlets, it is ensured that the pressure is continuously monitored near the flow front, thereby ensuring that the resin front does not distort the fibres. Thereby, a high quality infusion and in turn a high quality composite structure is obtained.

The resin inlet may comprise a resin inlet channel or feed channel and optionally an inlet box or port. Accordingly, the pressure sensor may for instance be connected directly to the resin inlet channel or the inlet box or port.

The resin may optionally be supplied to the fibre lay-up via distribution layers arranged between the fibre lay-up and the resin inlets. The resin inlets may comprise resin channels, often extending in the longitudinal direction of the mould, and optionally an inlet box. The resin channels are in the following sometimes referred to as feed channels. The two terms may be used interchangeably. The pressure sensor may be attached to the resin channels or the inlet box.

According to an advantageous embodiment, the mould cavity is divided into separate segments, wherein steps f)-i) are carried out separately for each segment, and wherein resin inlet pressure is monitored for each segment. Thereby, the pressure can be monitored separately for each segment, which is particularly advantageous, if the mould, fibre lay-up, and the resin inlets comprise local variations in height. Both the distribution layers and the resin inlets may be segmented.

According to another advantageous embodiment, the mould cavity is divided into separate segments, wherein the resin flow rate is controlled separately for each segment. Thereby, the fibre/resin ratio can be controlled to a higher degree for each segment thereby more accurately ensuring that the fibre/resin ratio of all parts is kept within the desired tolerances. This is particular relevant, when manufacturing curved objects and where the mould has a significant height difference between various parts of the mould.

According to yet another advantageous embodiment, a single pressure sensor is connected to a first resin inlet of a first segment and a second resin inlet of a second segment, and wherein in step g) a maximum pressure of the first resin inlet and the second inlet is monitored and fed back to the controller in step h). Thereby, two or more segments can be monitored and controlled via use of a single pressure sensor, thereby simplifying the feedback setup and lowering overall costs. The at least one sensor may advantageously be arranged at a lowermost point so as to measure the maximum pressure of the particular segment.

In practice, step h) may be carried out by controlling the flow rate of mixed resin into the resin inlets. This may be controlled by an infusion machine, and the mixed resin may comprise a resin and a hardening agent.

According to a first advantageous embodiment, the resin is supplied directly into a segment, i.e. directly into a resin inlet of the particular segment. According to a second advantageous embodiment, the resin is supplied to a segment indirectly via another segment. This can for instance be carried out by segmenting the resin inlets and optionally the distribution layers and connecting the segmented inlet via loops, e.g. controlled via valve means.

Further, the pressure sensor may be used to measure the vacuum level in the mould cavity during the evacuation. Accordingly, the invention also contemplates an embodiment, wherein after step e) a pressure level is measured within the mould cavity over a predetermined period of time before carrying out step f). By monitoring the pressure level for the predetermined period of time, it can be ensured that there is no leakage in the mould cavity. The pressure level can be measured via the same pressure transducers, since they are communicating with the mould cavity. Thereby, it is also possible to monitor each segment separately, thereby being able to locate a potential leakage more quickly.

Further, the measured pressure level should be the same in all segments after the evacuation. Accordingly, monitoring of the pressure levels before injecting resin into the mould cavity can be used to identify an erroneously connected or faulty pressure sensor, if one sensor provides an output different from the others.

According to yet another advantageous embodiment, the fibre-reinforced polymer object is a blade shell part and the fibre lay-up forms part of a load carrying structure integrated into the blade shell part. Thus, it is seen that the fibre-layup may form the main laminate of the blade shell part. The blade shell part may for instance form the pressure side or the suction side of the blade. The blade shell part may form a blade shell half of a pre-bent wind turbine blade comprising two blade shell halves being interconnected along a leading edge and a trailing edge, said blade having a root region, an airfoil region with a tip region, optionally a transition region between the root region and the airfoil region. The pressure sensor may be arranged above the fibre insertion forming the main laminate so as to sense the pressure supplied to the fibre insertion.

As previously mentioned, the method may include the step of placing a distribution layer above the fibre lay-up, e.g. between steps a) and b). The term distribution layer is to be understood as a layer which allows for a higher resin flow speed than allowed for by the fibre layer.

The possible segmentation can be carried out by providing at least one segmentation area in the distribution layer by dividing the distribution layer into at least two distribution layer segments as seen in a longitudinal direction of the rigid mould part by providing at least one transversely extending flow barrier in the distribution layer preventing or restricting longitudinal resin flow through the distribution layer as explained in EP 2 404 743. Step b) may include placing at least one longitudinally extending feed channel above the distribution layer, said first feed channel being open towards the distribution layer so as to provide resin communication therewith, said first feed channel preferably extending substantially from the root region to the tip region and being divided into at least two separate feed channel sections, a feed channel section being arranged in each distribution layer segment.

The fibre lay-up may comprise fibre layers in form of unidirectional mats, woven mats, non-woven mats, etc. and a combination thereof, and the fibre mats may contain glass fibres, carbon fibres, aramid fibres, steel fibres, natural fibres, etc. and a combination thereof. The resin can be a polyester resin, a vinylester resin, an epoxy resin or any other thermosetting resin or polymer or it can be a thermoplastic resin or polymer.

The segmentation area providing at least one transversely extending flow barrier in the distribution layer prevents a too fast resin flow through the distribution layer in the longitudinal direction of the mould, and especially prevents or restricts longitudinal resin flow between the two distribution layer segments formed by the flow barrier, whereby a desired fibre/resin ratio is obtained in the fibre lay-up below the two distribution layers.

Further, by dividing the first feed channel into feed channel sections substantially corresponding to the distribution layer segments it is possible to control the supply of resin to the distribution layer segments and thereby to the lay-up therebelow so as to obtain the desired fibre/resin ratio in the fibre lay-up.

A release medium and subsequently a gelcoat may be applied to the mould surface prior to step a).

The gelcoat enables easy demoulding of the shell half after curing of the resin and the gelcoat defines the outer surface of the finished blade shell half.

Additionally, a tear-off layer, preferably in the form of a perforated polymer film layer, may be placed on the fibre lay-up, i.e. between the fibre lay-up and the distribution layer or between the fibre lay-up and the resin inlets. Since the cured resin which remains in the first feed channel, in any additional feed channels, and in the distribution layer does not contribute essentially to the strength of the blade shell half, it is preferred to remove the feed channels and the distribution layer including the resin cured therein from the moulded blade shell half. The use of a tear-off layer facilitates the removal of the first feed channel, any additional feed channels, the distribution layer and cured resin remaining in these parts. Additionally, the removal of feed channels and the distribution layer reduces the weight of the blade shell half without essentially reducing the strength thereof.

The first feed channel and any additional feed channels may be formed of a tube with an omega profile. The mould cavity may be evacuated by means of one or more vacuum channels, advantageously provided along the rim of the mould.

According to an embodiment of the invention, the first feed channel may be divided into three feed channel sections and the distribution layer is divided into three distribution layer segments.

The segmentation embodiments have proved particularly advantageous when moulding upwind blade shell halves, wherein the height difference between the highest and the lowest point of the mould surface exceed 1 m. However, it should be noted that the first feed channel may be divided into more than three feed channel sections and the distribution layer may be divided into more than three distribution layer segments.

According to a further embodiment of the invention, the transversely extending flow barrier may be provided by omitting the distribution layer in a transversely extending portion thereof. The transversely extending portion in which the distribution layer is omitted may have a width of 5-100 cm, optionally of 15-80 cm and optionally of 25-50 cm.

According to an additional embodiment of the invention, the transversely extending flow barrier may be provided by applying a formable substance, such as a so-called tacky tape, to the distribution layer in a transversely extending portion thereof. In practice, excellent results have been obtained by means of this embodiment.

According to an embodiment of the invention the first feed channel may be divided into sections adjacent to or in the segmentation area in which the distribution layer is divided into distribution layer segments. According to the invention, the first feed channel may be divided into feed channel sections and the distribution layer may be divided into distribution layer segments so that a height difference between a lowest and a highest level of the mould surface is at most 1.6 m, optionally 1.4 m, optionally 1.2 m, optionally 1.0 m and optionally 0.8 m.

Tests have shown that in order to obtain the desired fibre/resin ratio especially in the highest position area of adjacent sections, it is advantageous to provide a segmentation of the first feed channel and the distribution layer so that the above height difference is not too large, i.e. below 1.2 m. However, in certain cases a height difference of more than 1.2 m may be applicable.

The resin may be supplied to the inlet of the respective feed channel sections through supply lines from separate resin sources, each of said supply lines being provided with a valve means for stopping the resin flow. Optionally, resin may be supplied to the inlet of the respective feed channel sections through supply lines from a common resin source, each of the supply lines provided with a valve means for stopping the resin flow.

Additionally, according to the invention longitudinally adjacent sections of the first feed channel may be interconnected by a connection line provided with a valve means between adjacent ends of the adjacent feed channel sections to allow for an interruption of the resin flow between said adjacent feed channel sections, the feed channel preferably being provided with a single inlet. As a result, a simple arrangement is provided for feeding resin to the various feed channel sections allowing for controlling the supply of resin to the feed channel sections in the desired amounts and at the desired point of time by opening the closing the valve means.

According to a further embodiment of the invention, at least one additional essentially longitudinally extending feed channel may be arranged above the fibre distribution layer on either side of and laterally spaced apart from the longitudinally extending first feed channel, said additional feed channels preferably being continuous feed channels, i.e. they are not divided into sections, and preferably the transversely extending flow barrier is not provided in the distribution layer below said additional feed channel. By providing the additional feed channels, a faster and more reliable resin impregnation of the fibre lay-up areas laterally spaced apart from the fibre lay-up area below the first feed channel is obtained compared to the situation, where such additional feed channels are not provided.

According to an embodiment of the invention, a plurality of fibre layers is placed on top of each other in a longitudinally extending zone of the mould, said plurality of fibre layers forming a load-bearing structure of the blade shell half, said structure comprising a substantially higher number of fibre layers than laterally adjacent areas of the fibre lay-up and wherein the at least one first feed channel is arranged in said zone forming the load-bearing structure. As a result, a blade shell half is formed provided with a load-bearing structure extending in the longitudinal direction of the blade shell half, and as seen in the transverse direction extending in an area of the lowest positioned portion of the mould. Thus, the above zone extends in the lowest positioned area of the blade shell half. Such a blade shell half is frequently used in the production of wind turbine blades.

Preferably, the transversely extending flow barrier is only provided in the above zone forming the load-bearing structure and may extend over a portion of or over the entire width of said zone. However, it is preferred that the flow barrier extends over essentially the entire width of said zone. The zone forming the load-bearing structure may have a thickness of 10-100 mm, optionally of 20-80 mm, optionally of 30-50 mm, and a width of 30-200 cm, optionally of 40-150 cm and optionally of 50-120 cm. The width of the zone forming the load-bearing structure may decrease from the root region towards the tip region. The thickness of the zone forming the load-bearing structure may decrease from root region toward the tip region. The zone forming the load-bearing structure may extend from the root region to the tip region.

According to an additional embodiment of the invention, the resin supply to adjacent sections of the first feed channel may be controlled so that the resin supply to the section having the lowest positioned point is stopped prior to stopping the resin supply to the section having the highest positioned point.

Preferably, resin is supplied to the different channel sections of the first feed channel simultaneously with or after resin is supplied to the feed channel section having a higher positioned point than an adjacent channel section. After the resin supply to the additional channel sections has been stopped, resin is supplied to the fibre lay-up arranged in the higher positioned area, whereby the desired fibre/resin ratio is obtained in the higher positioned area of the fibre lay-up. In this connection it should be noted that the transversely extending flow barrier between the two adjacent distribution layer segments prevents or restricts resin flow therebetween from the higher positioned distribution layer segment to the lower distribution layer segment.

According to an embodiment of the invention, the supply of resin to the feed channel sections having the highest positioned point of the first feed channel may be continued after the resin supply to any other first feed channel sections has been stopped and preferably also after the supply of resin to any additional feed channels has been stopped, the supply of resin to the feed channel section having the highest positioned point being continued until the resin supply to the mould cavity is completed.

According to an embodiment of the invention, the resin inlet to the first feed channel may be arranged at 25-60% of the length of the blade shell half from the end of the root region, optionally at 25-55% thereof, and optionally at 30-50% thereof. Both when moulding the upwind shell half and the downwind shell half, it has proved to be advantageous to provide the inlet to the first feed channel in the above area of the blade shell half, i.e. the mould. However, an arrangement of the resin inlet to the first feed channel in the above area of the blade shell half have proved to be particularly advantageous when moulding the upwind blade shell half.

According to a further embodiment of the invention, the resin inlet to the first feed channel may be arranged at or adjacent the highest point thereof. This embodiment is proved to be particularly advantageous when moulding the upwind blade shell half. Further, it has proved to be advantageous to provide the resin inlet to any additional feed channels laterally spaced apart from the first feed channel at or adjacent the highest point thereof. According to an embodiment of the invention, the first feed channel may be arranged in an area of the lowermost portion of the fibre lay-up as seen in the transverse direction of the mould.

Preferably, the mould part for moulding the upwind shell half may be arranged so that a line of the mould part corresponding to the centre line of the root region of the blade is arranged to tilt slightly upwardly relative to horizontal from the root region towards the tip region, thereby reducing the height difference between the lowermost portion of the mould surface in the root region and in the tip region. In this connection the lowermost portion of the mould surface in the root region and the tip region may be arranged at approximately the same level. Such an arrangement is particularly advantageous when moulding the upwind shell half, as the height difference between the lowermost portion of the mould surface and the highest portion of the mould surface thereby is minimised.

Furthermore, the mould part for moulding the downwind shell half may be arranged so that a line of the mould part corresponding to the centre line of the root region of the blade is arranged to tilt slightly downwardly relative to horizontal from the root region towards the tip region, thereby reducing the height difference between the lowermost portion of the mould surface in the root region and in the tip region. Additionally, the mould part for moulding the upwind and downwind shell half, respectively, may be arranged to that the line corresponding to the centre line of the root region of the blade is titled upwardly and downwardly by the same degree. Thereby, a subsequent closing step, wherein the shell halves are joined while being retained in their respective mould parts, is facilitated.

The blade of the pre-bent wind turbine and thereby the blade shell half may have a length of more than 30 m, optionally of more than 40 m, optionally of more than 50 m and optionally of more than 60 m. The blade and thereby the shell half may be pre-bent to such an extent that the tip of the blade and thereby the tip of the shell half is arranged more than 0.5 m, alternatively more than 1 m, alternatively more than 2 m, alternatively more than 3 m and alternatively more than 4 m from the centre line of the root.

According to a second aspect, the object is obtained by a moulding system of the aforementioned kind, wherein the system further comprises: one or more pressure sensors connected to the resin inlets, the pressure sensors being adapted to measure a pressure in the resin inlets and generating a signal indicative of the measured pressure, and a control unit for controlling the polymer supply unit based on said signal and adapted to adjusting a resin flow rate, if pressure measured by the pressure sensors is below a lower threshold level or above a higher threshold level.

Accordingly, it is seen that the invention provides a VARTM based moulding system that is particularly suited for carrying out the manufacturing method according to the invention. The pressure sensors sense the resin pressure at the resin inlets and feed back a signal to a control unit that controls the polymer supply unit or the infusion machine, thereby ensuring that the resin pressure is kept within the desired tolerances, thereby preventing a thin laminate, too high fibre/resin ratio and possibly dry glass or air pockets due to a too low resin pressure, and preventing wrinkles or resin pools and a too low fibre/resin ratio due to release of the pretension of the fibre layers, when the resin pressure becomes too high.

According to a first advantageous embodiment, the resin inlet comprises a resin inlet channel or feed channel and optionally an inlet box or port.

A connection part may be connected to or integrated into the resin inlet channel or inlet box, so that the pressure sensor may be connected to the connection part. This can for instance be carried out via a threaded connection. However, it may also be sufficient to connect the pressure sensor to the inlet via a hose or tube that supplies resin to the pressure sensor from the resin inlet, thereby monitoring the pressure level in the resin inlet directly.

The pressure sensor may advantageously be connected to the connection part via a sealed bushing having an o-ring preventing resin to flow into threads of the threaded connection. The pressure sensor may advantageously be a diaphragm pressure transducer, advantageously a differential pressure transducer. The pressure sensor may be open-ended, which will prevent the resin from hardening at the pressure sensor, in which case the sensor otherwise could only be used once.

It is also possible to use a pressure sensor measuring the absolute pressure. In practice, this will however often necessitate the use of two separate sensors.

As previously indicated, the pressure sensor may comprise a tube that can be connected directly into the mould cavity or the resin inlet. The pressure sensor may comprise a tube that can be connected to the mould cavity via a hose.

In one embodiment, a small space or chamber is formed in front of a diaphragm of the pressure sensor. Again, this setup favours the use of an open-ended pressure sensor so as to prevent the resin from hardening.

The diaphragm of the pressure sensor may advantageously be coated with a release agent so as to ensure that resin can be removed from the diaphragm or the hose.

As explained for the method claims, the system may comprise a plurality of sensors. The sensors may be arranged so as to sense the resin pressure of different segments of the mould cavity. Further, the resin supply unit may comprise separate feed channels so as to supply resin to separate resin inlets. Each resin inlet or resin inlet segment may be provided with one or more pressure sensors. Each resin inlet or resin inlet segment may be assigned to an individual segment of the mould cavity.

BRIEF DESCRIPTION OF THE DRAWINGS

The invention is explained in details below with reference to an embodiment shown in the drawings in which

FIG. 4 is a schematic top view of the mould part shown in FIG. 3, the width of said mould part being enlarged for illustrative purposes;

FIG. 5 is a schematic top view of the encircled area A in FIG. 4;

FIG. 6 is a schematic top view of the encircled area B in FIG. 4;

DETAILED DESCRIPTION OF THE INVENTION

Figure 1:
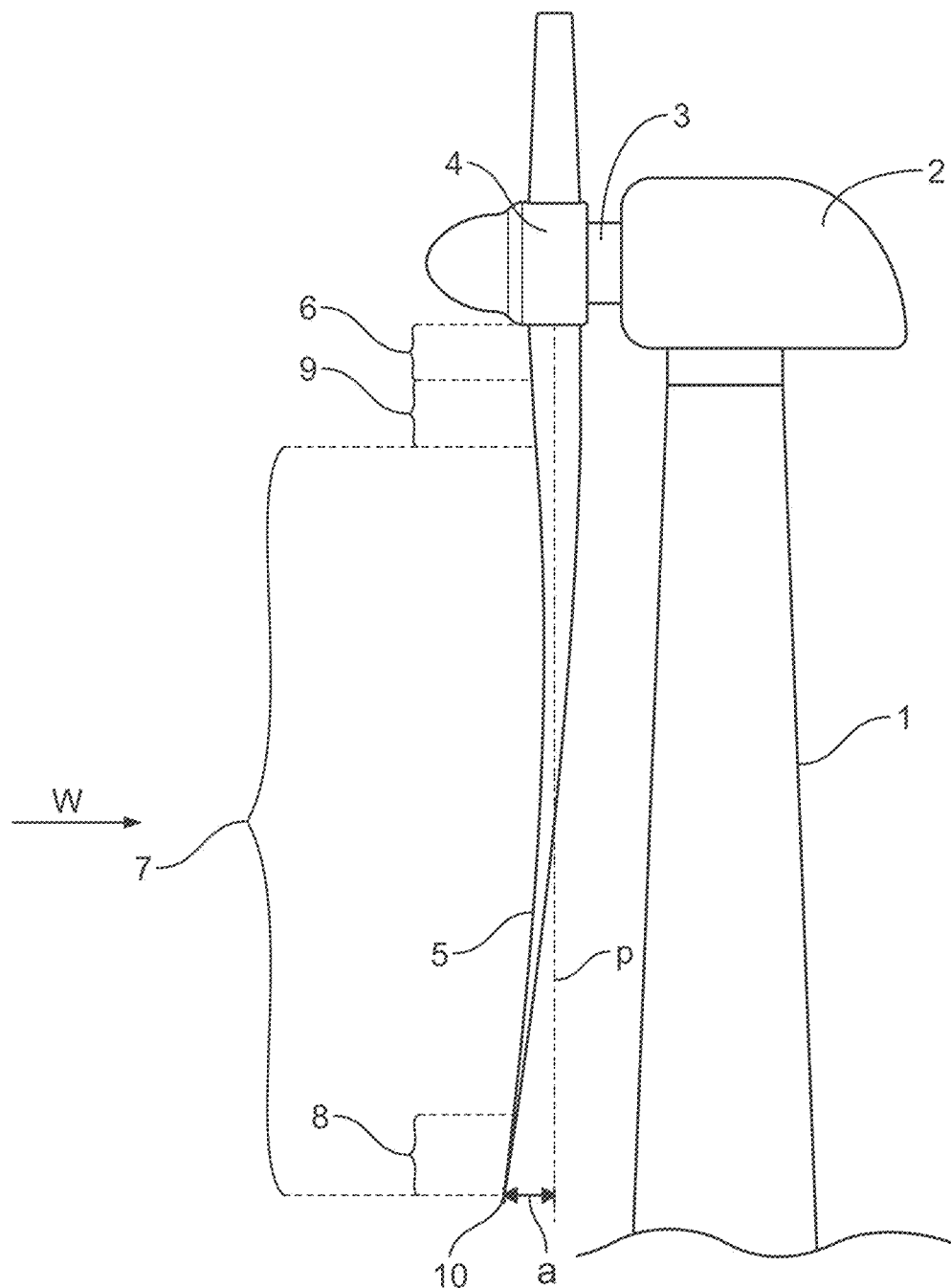
FIG. 1 is a schematic view of a wind turbine provided with three pre-bent blades, at least one of these blades having a blade shell half being produced according to the method according to the invention.
Figure 2:
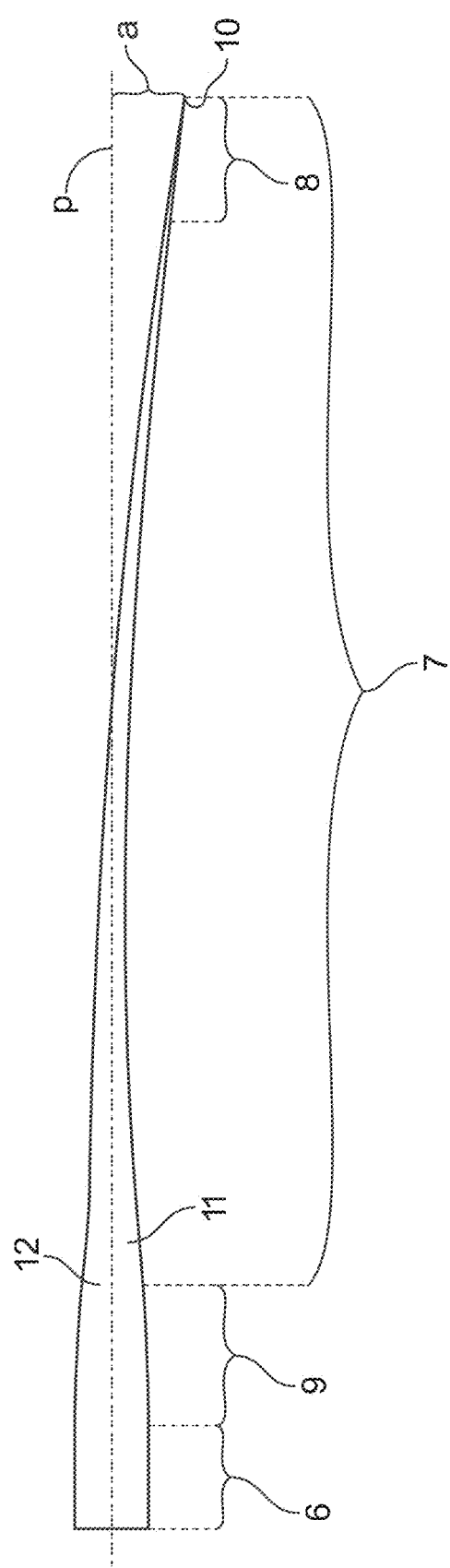
FIG. 2 is a side schematic view of one of the blades shown in FIG. 1.

The upwind wind turbine schematically shown in FIG. 1 comprises a tower 1, a nacelle 2 arranged rotatably on top of the tower 1, a main shaft 3 extending essentially horizontally from the nacelle 2 and being provided with a hub 4 from which three blades 5 extend radially. Each blade comprises a root region 6, an airfoil region 7 with a tip region 8, a transition region 9 between the root region 6 and the airfoil region 7, and a centre line P being defined by the centre line of the normally cylindrically shaped root region. This axis often corresponds to a pitch axis of the blade. The tip region 8 of the airfoil region 7 ends in a tip 10. The different regions of the blades are also shown in FIG. 2.

The blade 5 is a pre-bent blade extending forwardly against the wind in a forwardly curving manner so as to place the tip 10 at distance a in front of the centre line P as seen in the wind direction W. The blade 5 comprises two blade shell halves 11, 12 connecting along a leading edge and a trailing edge of the blade. The blade shell half 11 forms the pressure side, also called the upwind side, of the blade, as it faces the wind during operation of the wind turbine. The blade shell half 12 forms the suction side, also called the downwind side, of the blade, as it faces away from the wind during operation of the wind turbine.

Figure 8A:
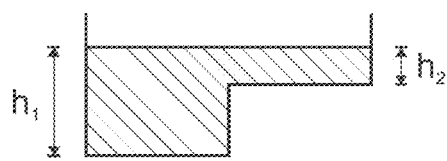
FIGS. 8a and 8b illustrates resin levels in a non-segmented and a segmented mould cavity, respectively.
Figure 8B:
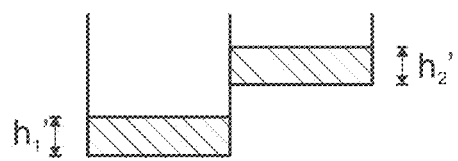

FIG. 8a shows the problem of infusing resin into mould cavities with height differences and wherein fibre material has previously been arranged. The resin supply forms a reservoir and due to the height differences in the mould cavities, the resin level will have a first height $h_1$ in a first part of the mould, and a second height $h_2$ in a second part of the mould. The resin level or pressure is therefore set as a trade-off to accommodate for the height differences. Thus, due to the gravity acting on the resin, a too high fibre/resin ratio tends to be formed at the highest positioned areas of the mould, and a too low fibre/resin ratio tends to be formed at the lowest positioned areas of the mould as seen in the longitudinal direction thereof. By segmenting the mould cavity into separate cavities as shown in FIG. 8b, it is possible to individually control the resin level or resin pressure in the separate cavities so that the resin level in the first part of the mould may be set to $h_1'$, and the resin level in the second part of the mould may be set to $h_2'$, thereby ensuring that the fibre/resin is kept close to the optimum for the entire finished structure.

In the following and with reference to FIGS. 3-7, it will be described how segmentation of the infusion areas and the mould cavity may be used for minimising the effect of gravity acting on the resin when moulding forwardly curved wind turbine blade shell halves. The embodiment described refers to the production of a blade shell half 11 forming the upwind side of the blade 5.

Figure 3:
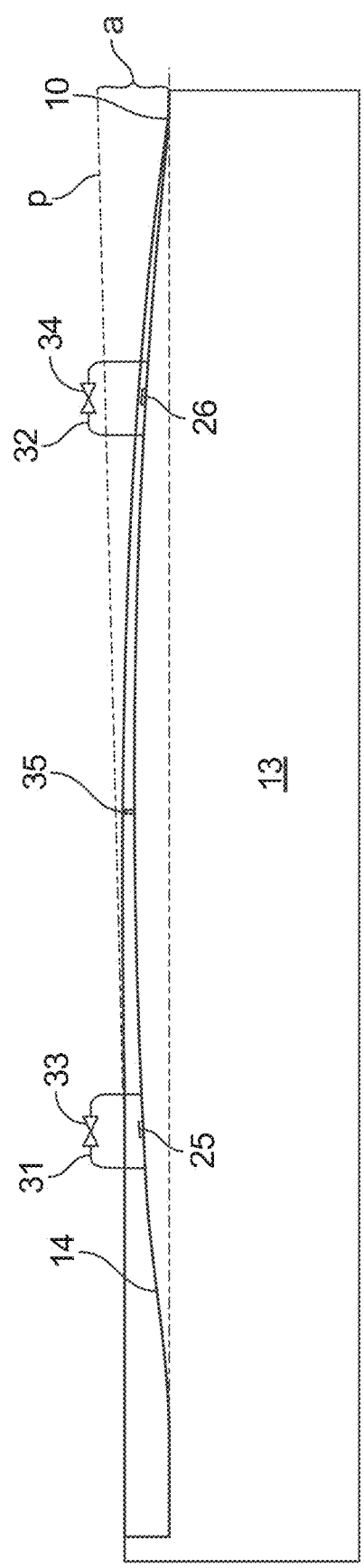
FIG. 3 is a schematic, longitudinal, sectional view of a rigid mould part for forming the pressure side, i.e. the upwind side of a blade shell half.

For manufacturing the blade shell half 11, a rigid mould part 13 is provided, said mould part 13 having a mould surface 14 forming the outer surface of the shell half, i.e. the pressure side of the blade. The mould part 13 is provided with an upper rim 15, as clearly seen in FIG. 7. As it most clearly appears from FIG. 3, the mould for moulding the upwind shell half 11 is arranged so that the line of the mould part corresponding to the centre line P of the root region of the blade is arranged to tilt slightly upwards relative to horizontal from the root region towards the tip region. In the present embodiment the lowermost portion of the mould surface in the root region and in the tip region is arranged at the same level, as shown in FIG. 3. As a result, the height difference between the highest and the lowest point of the lowermost portion of the mould surface when seen in the longitudinal direction is minimised.

A lay-up 16 comprising a number of fibre layers is placed on the mould surface 14. In the embodiment shown the fibre lay-up 16 comprises first fibre layers 17 arranged directly on the mould surface. On the first fibre layers a large number of fibre layers are placed in a longitudinally extending zone of the mould so as to provide a load-bearing structure 18 of the blade shell half.

As seen in the transverse direction of the mould the zone forming the load-bearing structure 18 is provided in the lowermost area of the mould surface. In the longitudinal direction the zone comprising a large number of fibre layers extends essentially from the root region to the tip region, as shown by dotted lines in FIG. 4. Additionally a plurality of fibre layers is arranged on the first lower fibre layers 17 at a region corresponding to the region of the leading edge and the trailing edge, respectively, of the blade shell half to provide a leading edge fibre reinforcement 20 and a trailing edge fibre reinforcement 19. A first core material 21 is arranged between the load-bearing structure 18 and the leading edge fibre reinforcement 19 and a second core material 22 is arranged between the load-bearing structure 18 and the trailing edge fibre reinforcement 20. The core material can be a hard polymer foam or balsawood. The fibre lay-up 16 is completed by arranging second fibre layers 23 on top of the load-bearing structure 18, the leading edge fibre reinforcement 19, the trailing edge fibre reinforcement 20, the first core material 21 and the second core material 22.

Next a distribution layer 24 is arranged on the second fibre layers 23. The distribution layer is divided into three distribution layer segments 24A, 24B, 24C by providing two flow barriers 25, 26 in the distribution layer 24 in areas thereof above the load-bearing structure 18. The flow barriers 25, 26 have a transverse extent so that they are provided only in the area of the distribution layer above the load-bearing structure 18 and not in the adjacent area of the lay-up 16. In the present embodiment the flow barriers 25, 26 are formed by a formable substance, such as a so-called tacky tape, and restrict longitudinal resin flow between the distribution layer segments.

Figure 7:
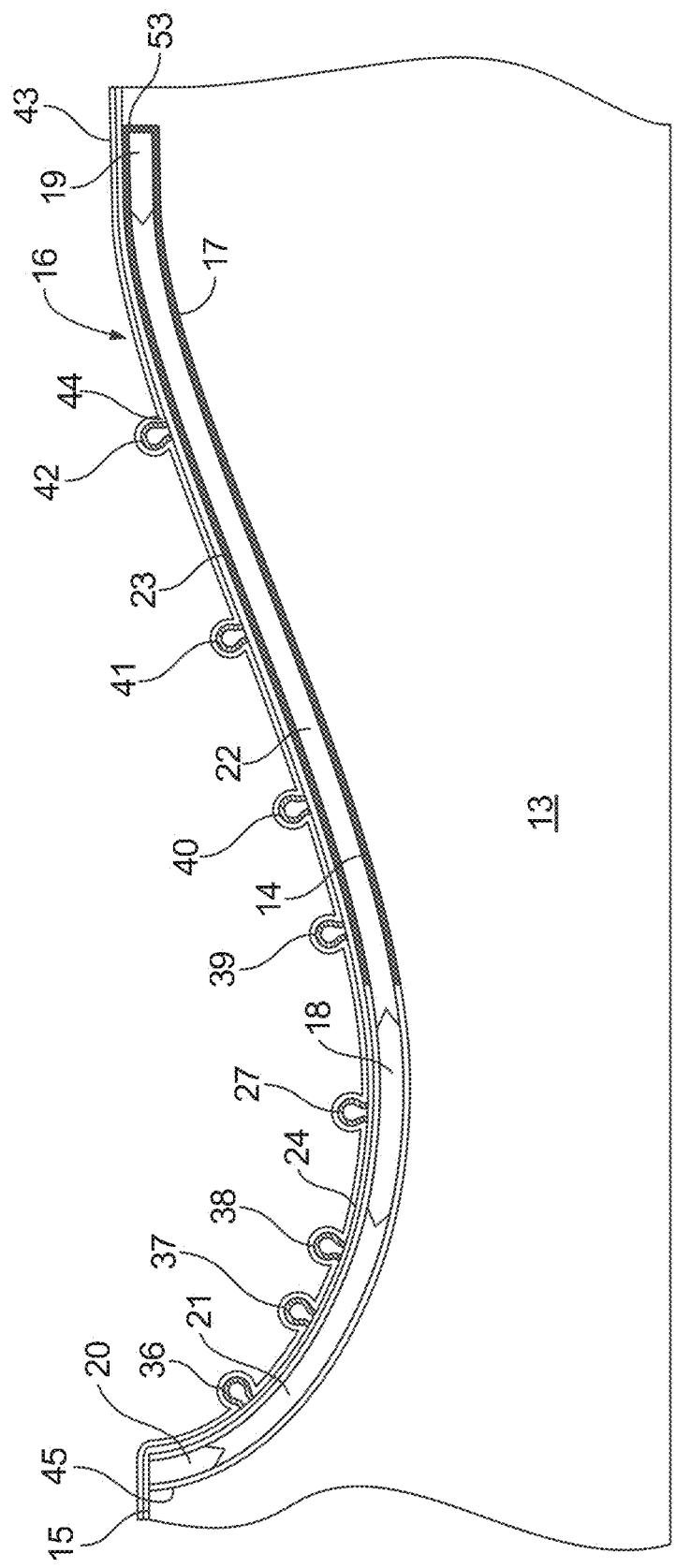
FIG. 7 is a schematic cross-sectional view along the lines VII in FIG. 4.

As especially shown in FIG. 3, the flow barriers 25, 26 are arranged where the height difference between the lowest and the highest point of the mould surface 14 is within a pre-determined range, such as below 1 m. A first longitudinally extending feed channel (or resin inlet) 27 is arranged on top of the distribution 24. The feed channel 27 is formed as a tube with an omega profile being opened towards the distribution layer 24, as shown in FIG. 7.

The first feed channel 27 extends from the root region to the tip region, as shown in FIG. 4. It is divided into three feed channel sections 28, 29, 30 which are arranged in respective distribution layer segments. Longitudinally adjacent sections of the first feed channel 27 are interconnected by means of a connection line 31, 32 to provide resin communication between adjacent feed channel sections. A valve 33, 34 is arranged in each connection line 31, 32 to allow for an interruption of the resin flow between the adjacent feed channel sections. The connection lines 31, 32 provided with the valve 33, 34, respectively, most clearly appear from FIGS. 4-6.

Finally, it should be noted that an inlet box 35 to the first feed channel is provided in the feed channel section and preferably at or in the highest area thereof which is also the highest area of the mould surface as seen in the longitudinal direction thereof.

Further, additional substantially longitudinally extending feed channels 36-42 are arranged above the fibre distribution layer 24 on either side of and laterally spaced apart from the longitudinally extending first feed channel 27. As seen in FIG. 4, the additional feed channels are continuous feed channels, i.e. they are not divided into sections, and the transversely extending flow barriers 25, 26 are not provided in the distribution layer below the additional feed channels. Further, the additional feed channels 36-42 are placed laterally outside the load-bearing structure 18. Inlet boxes 46-52 to the additional feed channels are arranged in line with the inlet box 35 to the first feed channel as seen in the transverse direction of the mould.

A vacuum bag 43 is arranged on top of the distribution layer 24 and the feed channels and sealed to the rim 15 of the mould part to form a mould cavity 44 between the vacuum bag 43 and the mould surface 14 of the mould part 13. The mould cavity is then evacuated and resin is supplied to the mould cavity.

Resin is supplied to the mould cavity through the inlet boxes 35 to the mid section 29 of the first feed channel 27 and through the inlet boxes 46-52 to the additional feed channels 36-42. First, resin is supplied to the first feed channel 27, the valves 33, 34 in the connection lines 31, 32 being opened so that all three sections 28, 29, 30 of the first feed channel 27 are supplied with resin.

When the resin flow front towards the leading edge has passed the feed channel 38, resin is supplied to the feed channel 38 through the inlet box 48. Correspondingly, resin is supplied to the feed channel 39 through the inlet box 49 when the resin flow front towards the trailing edge has passed the feed channel 39.

Then, the valve 33, 34 is closed to stop the resin supply to the sections 28, 30 of the first feed channel 27. Resin supplied to the highest positioned section 29 of the first feed channel 27 is continued. Resin is then supplied in sequence to the feed channel 40, the feed channel 37, the feed channel 41, the feed channel 36, and the feed channel 42 through the respective inlet boxes 50, 47, 51, 46, 52. During the sequential resin supply to the above feed channels, the resin supply to the feed channels 39, 38, 40, 37, 41, 36, 42 is stopped at pre-determined points in time so as to obtain the desired resin impregnation of the lay-up. After the resin supply to all the additional feed channels has been stopped the resin supply to the inlet 35 to the first feed channel 27 continues until the desired fibre/resin ratio has been obtained in the fibre lay-up, especially in the zone of the fibre lay-up forming the load-bearing structure 18.

The provision of the flow barriers 25, 26 restricts or prevents resin flow through the distribution layer from the distribution layer segment 24B to the distribution layer segments 24A and 24C being positioned at a lower level than the distribution layer segment 24B during the continuous supply of resin to the channel section 27 being positioned above the distribution layer segment 24B. As a result, a resin surplus in the lay-up below the distribution layer segments 24A and 24B is prevented.

A resin surplus in said distribution layer segments 24A and 24B is further prevented by disconnecting the resin supply to the feed channel sections 27, 29 arranged above these the distribution layer segments 24A and 24B.

When the supply of resin is completed, the resin is allow to cure and the finished blade shell half forming the upwind side of the blade is connected to a finished blade shell half forming the downwind side of the blade, thereby forming a wind turbine blade.

However, even in the manufacturing setup described in reference to FIGS. 3-7, it has proven difficult to control the fibre/resin ratio of the separate areas of the wind turbine blade shell to a high degree. Therefore, according to the invention, the pressure level of each segment is controlled via a feedback loop, which is described in the following.

Figure 9:
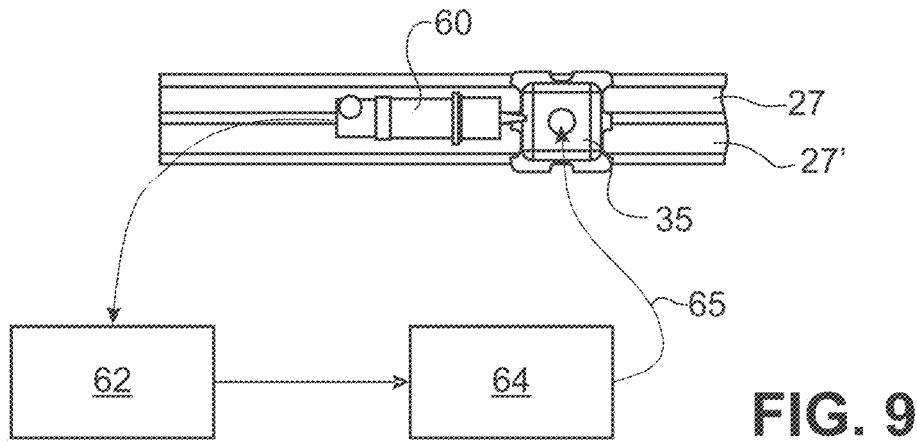
FIG. 9 shows a first embodiment of the feedback loop according to the invention.

FIG. 9 shows a first embodiment utilising the feedback loop according to the invention. Resin is supplied from a polymer or resin supply unit 64 via a resin supply line 65 to the inlet box 35, which in turn distributes resin to first resin inlets 27, 27'. A pressure sensor 60 is connected to the inlet box 35 and senses the pressure of the resin supplied to the first resin inlets 27, 27'. The pressure sensor 60 generates a signal indicative of the resin pressure and sends this signal to a control unit 62, which is adapted to control the polymer supply unit 64 based on the signal received from the pressure sensor and to increase or decrease the flow rate, if pressure measured by the pressure sensors is below a lower threshold level or above a higher threshold level, respectively. The system of course also comprises a vacuum source (not shown) connected to the mould cavity and adapted for evacuating and drawing resin into the mould cavity.

Figure 10:
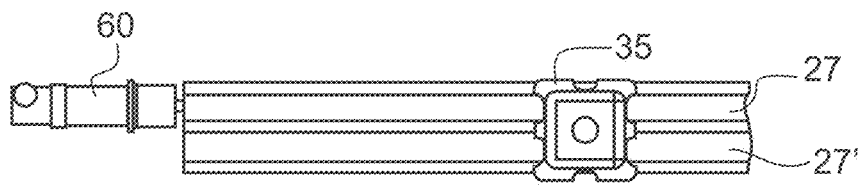
FIG. 10 shows a second embodiment according to the invention.

FIG. 10 shows a part of a second embodiment utilising the feedback loop according to the invention. The second embodiment differs from the first embodiment in that the pressure sensor 60 is connected directly to the first resin inlet 27, optionally via a hose (not shown).

Figure 11:
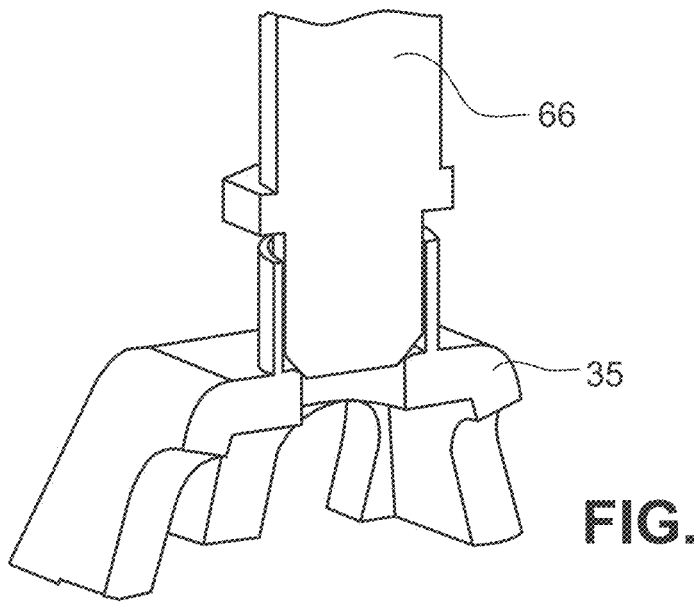
FIG. 11 shows a resin inlet box and a pressure sensor connected to the resin inlet box.

FIG. 11 shows a cut-out of the inlet box 35 with a pressure sensor connected directly to the inlet box 35, which provides a simple way of implementing the pressure sensing.

Figure 12:
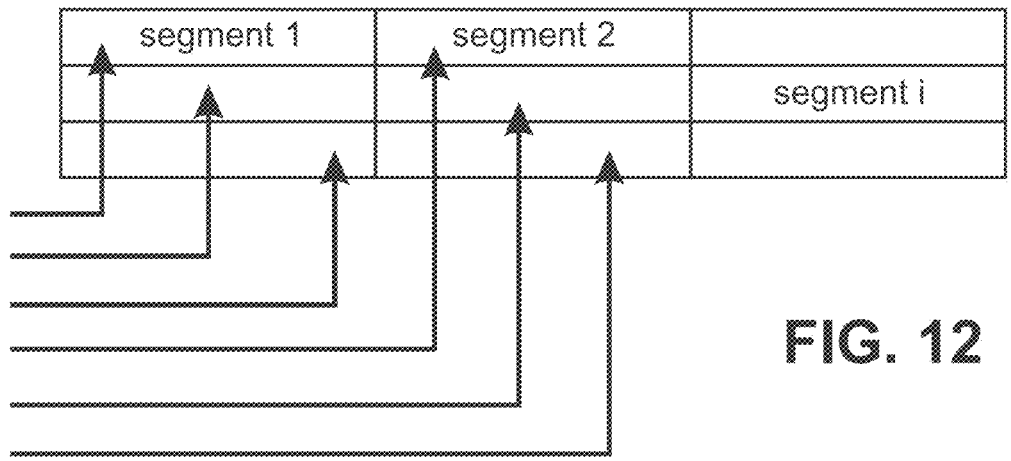
FIG. 12 shows an embodiment, where resin is supplied directly into each segment.

Resin may be fed to each segment via separate supply lines as illustrated in FIG. 12. In such an embodiment each segment is provided with a pressure sensor and a feedback loop to control the pressure of the resin supplied to the segments. In an alternative embodiment shown in FIG. 13, the resin is supplied to at least some of the segments via intermediary segments. A resin supply line is connected to the intermediary segment and resin is then supplied to other segments by opening a valve 34. Conversely, the resin supply to the end segment can also be cut off by closing the valve, similar to the embodiments described with reference to FIGS. 3-7.

Figure 13:
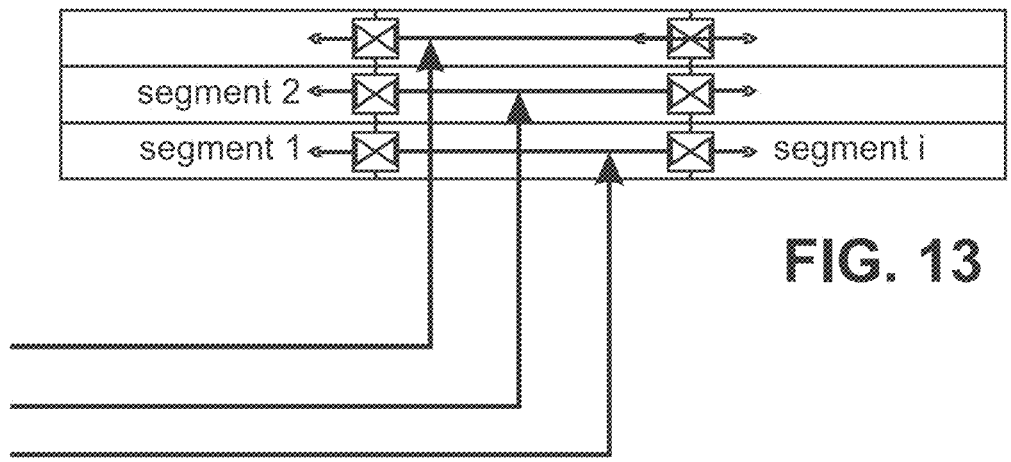
FIG. 13 shows an embodiment, where resin is supplied into segments via intermediary segments.
Figure 14:
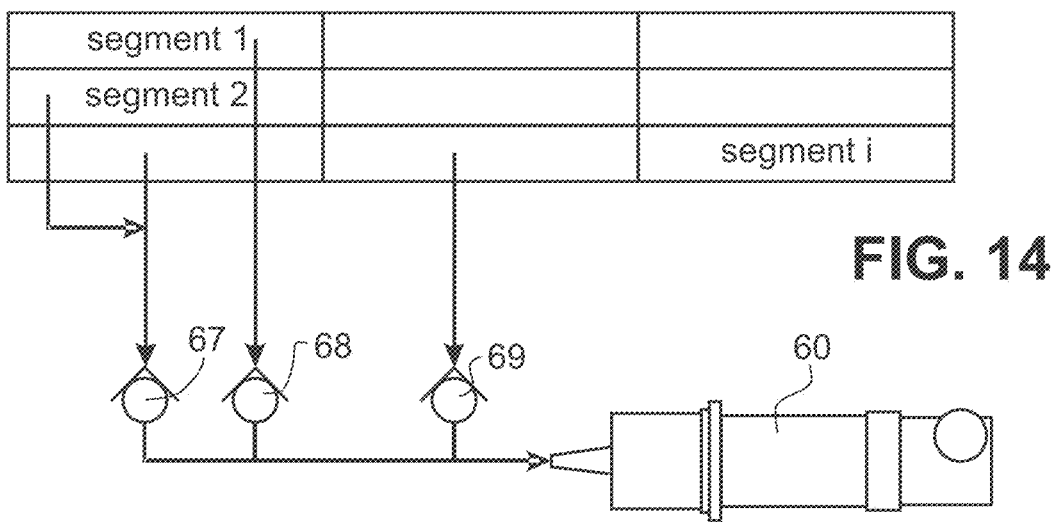
FIG. 14 shows an embodiment, where a single pressure sensor senses the resin pressure in a plurality of separate segments.

In one advantageous setup shown in FIG. 14, it is possible to use a single pressure sensor 60 to measure the pressure of a plurality of segments. Thus, the various segments each comprise an outlet 67, 68, 69 that leads resin to the pressure sensor 60. Thus, the pressure sensor 60 measures the maximum pressure of the various segments. This setup is particular advantageous to the setup utilising indirect resin supply as shown in FIG. 13. The setup makes it possible to use a reduced number of pressure sensors and still be able to control the resin pressure in each segment by the feedback loop according to the invention.

Figures 15A, 15B:
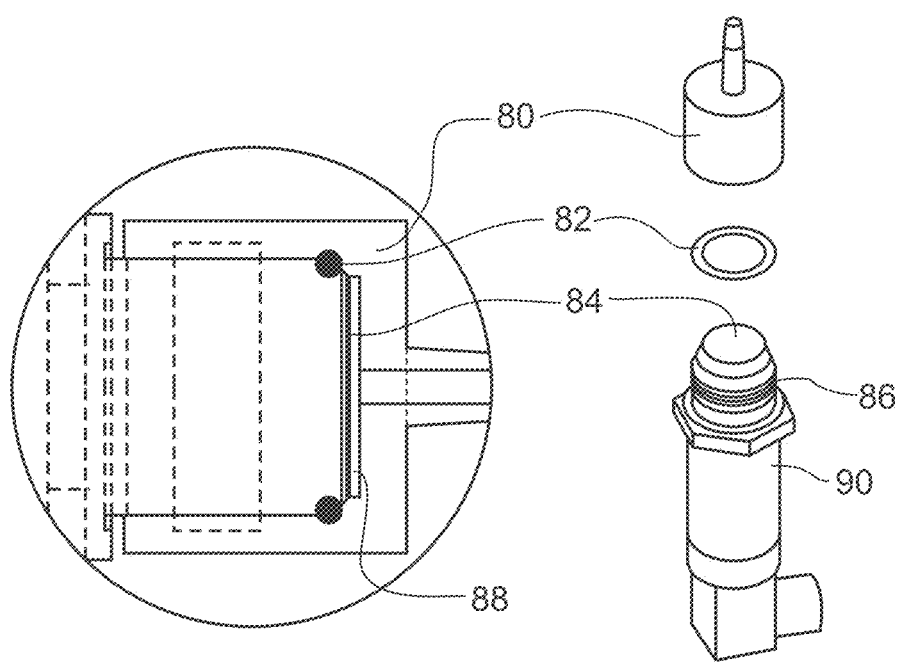
FIGS. 15a and 15b show a cross-section of a part of a pressure sensor and an exploded view of the pressure sensor, respectively.

FIGS. 15a and 15b show a cross-section of a part of the pressure sensor 60 and an exploded view of the pressure sensor, respectively. The pressure sensor 60 is a differential diaphragm pressure transducer. A tube or cap 80 is connected to a pressure sensor body 90 via a threaded connection 86. The cap 80 is sealed against the pressure sensor body 90 by use of an o-ring 82 and forms a chamber 88 in front of a diaphragm 88 of the pressure sensor. The cap 80 has an opening whereby resin can be fed into the chamber 88, and the pressure on the diaphragm 84 can thereby be measured, e.g. by probing the deflection of the diaphragm.

Finally, it should be noted that the invention also relates to a wind turbine blade having at least one blade with at least one shell half being produced according to the method according to the invention, and a wind turbine being provided with such a blade.

The invention has been described with reference to advantageous embodiments. However, the scope of the invention is not limited to the described embodiment and alterations and modifications may be carried out without deviating from the scope of the invention. The feedback loop may for instance be used for non-segmented mould cavities as well.

LIST OF REFERENCE NUMERALS 1 tower
2 nacelle
3 main shaft
4 hub
5 blades
5 root region
7 airfoil region
8 tip region
9 transition region
10 tip
11,12 blade shell halves
13 mould part
14 mould surface
15 upper rim
16 fibre lay-up
17 first fibre layers
18 load-bearing structure
19 leading edge fibre reinforcement
20 trailing edge fibre reinforcement
21 first core material
22 second core material
23 second fibre layers
24 distribution layer
24A distribution layer segment
24B distribution layer segment
24C distribution layer segment
25,26 flow barriers
27, 27' first feed channel/first resin inlet
28-30 feed channel section/resin inlet section
31, 32 connection line
33, 34 valve
35 inlet box
36-42 additional feed channel
43 vacuum bag 44 mould cavity
45 leading edge
46-52 inlet box
53 trailing edge
60 pressure transducer
62 control unit
64 resin/polymer supply unit
65 resin supply line
66 resin/polymer supply nozzle/connector
67-69 outlets
80 tube/cap
82 o-ring
84 diaphragm
86 threaded connection
88 chamber
90 pressure sensor body
a distance
P centre line
W wind direction

The invention claimed is:

1. A method of manufacturing a fibre-reinforced polymer object by means of vacuum-assisted resin transfer moulding (VARTM), wherein a fibre lay-up is impregnated with a liquid resin in a mould cavity comprising a rigid mould part having a mould surface defining an outer surface of the object, said method comprising the steps of:
    a) arranging the fibre lay-up on the mould surface, wherein the fibre lay-up includes a plurality of fibre layers;
    b) arranging at least one resin inlet above the fibre lay-up;
    c) attaching one or more pressure sensors to the at least one resin inlet, above the fibre lay-up;
    d) arranging a vacuum bag on top of the rigid mould part and sealing the vacuum bag to the mould part to define the mould cavity;
    e) evacuating the mould cavity;
    f) supplying the liquid resin to the mould cavity via the at least one resin inlet to impregnate the fibre lay-up, the liquid resin being supplied at a resin flow rate;
    g) monitoring a pressure with the one or more pressure sensors and generating a signal indicative of said pressure;
    h) feeding said signal to a control unit that controls the resin flow rate supplied to the at least one resin inlet, wherein the control unit is configured such that the resin flow rate of the liquid resin is increased if the pressure monitored by the one or more pressure sensors, in step g), at the at least one resin inlet drops below a lower pressure threshold, wherein the control unit is further configured such that the resin flow rate of the liquid resin is decreased if the pressure monitored by the one or more pressure sensors, in step g), at the at least one resin inlet is above a higher pressure threshold, and wherein the higher pressure threshold is higher than the lower pressure threshold; and
    j) curing the resin to form the fibre-reinforced polymer object,
    wherein a further pressure sensor measures the pressure of a plurality of separate segments of the mould cavity via a respective resin outlet of each of said segments, said control unit configuration factoring in the measured pressure from said further pressure sensor.

2. The method according to claim 1, wherein the at least one resin inlet comprises a plurality of resin inlets, the mould cavity being divided into the plurality of separate segments with each having a respective one of the plurality of resin inlets, wherein steps f)-i) are carried out separately for each of said segments, and wherein a resin inlet pressure is monitored for each of said segments.

3. The method according to claim 2, wherein the resin flow rate is controlled separately for each of said segments.

4. The method according to claim 1, wherein the at least one resin inlet comprises a plurality of resin inlets, the mould cavity being divided into the plurality of separate segments with each having a respective one of the plurality of resin inlets, wherein the one or more pressure sensors comprises at least a single pressure sensor connected to both a first resin inlet of a first segment of said plurality of separate segments and a second resin inlet of a second segment of said plurality of separate segments, and wherein in step g) a maximum pressure of each of the first resin inlet and the second resin inlet is monitored and fed to the control unit in step h).

5. The method according to claim 1, wherein the at least one resin inlet comprises a plurality of resin inlets, the mould cavity being divided into the plurality of separate segments with each having a respective one of the plurality of resin inlets, wherein the resin is supplied directly into one of the plurality of separate segments, or alternatively, the resin is supplied to one of the plurality of separate segments indirectly via another one of the plurality of separate segments.

6. The method according to claim 1, wherein the fibre-reinforced polymer object forms part of a load carrying structure of a blade shell part.

7. The method according to claim 6, wherein the blade shell part forms a blade shell half of a pre-bent wind turbine blade comprising two blade shell halves being interconnected along a leading edge and a trailing edge of the pre-bent wind turbine blade, said wind turbine blade having a root region, an airfoil region with a tip region, and optionally a transition region between the root region and the airfoil region.

8. The method according to claim 1, wherein each of the at least one resin inlet comprises a resin inlet channel and an inlet box, each respective one or more pressure sensors of step c) being connected to a respective one of the resin inlet channel or inlet box by a connection part integrated into the respective resin inlet channel or inlet box.

* * * * *